(12) United States Patent
Kim

(10) Patent No.: US 6,192,008 B1
(45) Date of Patent: Feb. 20, 2001

(54) DEVICE AND METHOD FOR REPRODUCING RECORD INFORMATION FROM MAGNETO-OPTICAL RECORDING MEDIUM

(75) Inventor: Dae Young Kim, Seoul (KR)

(73) Assignee: LG Electronics, Inc., Seoul (KR)

( * ) Notice: Under 35 U.S.C. 154(b), the term of this patent shall be extended for 0 days.

(21) Appl. No.: 09/006,447

(22) Filed: Jan. 13, 1998

(30) Foreign Application Priority Data

Oct. 31, 1997 (KR) ................................................ 97-57475

(51) Int. Cl.[7] .................................................... G11B 11/00
(52) U.S. Cl. .............................................. 369/13; 360/114
(58) Field of Search ................................ 369/13, 58, 54, 369/14, 59, 47–48, 124, 32, 100, 60, 116, 275.2, 275.3, 275.4, 110; 360/114, 59

(56) References Cited

U.S. PATENT DOCUMENTS

| | | | |
|---|---|---|---|
| 5,371,721 | * 12/1994 | Greidanus et al. | 369/13 |
| 5,485,433 | * 1/1996 | Satomura et al. | 369/13 |
| 5,644,556 | * 7/1997 | Oikawa | 369/13 |
| 5,726,955 | * 3/1998 | Yonezawa et al. | 369/13 |
| 5,748,593 | * 5/1998 | Tanaka et al. | 369/59 |
| 5,886,958 | * 3/1999 | Yonezawa et al. | 369/13 |
| 5,986,977 | * 11/1999 | Birukawa et al. | 369/13 |

FOREIGN PATENT DOCUMENTS

| | | |
|---|---|---|
| 63-173252 | 7/1988 | (JP) . |
| 1292603 | 11/1989 | (JP) . |
| 4325948 | 11/1992 | (JP) . |

* cited by examiner

Primary Examiner—Ali Neyzari

(57) ABSTRACT

In a method and device for reproducing record information from a magneto-optical recording medium, reproducing light and an alternating magnetic field signal are applied onto the magneto-optical recording medium in order to detect the record information therefrom. Two or more reference values and detected reproducing signal are compared with each other, and based on the comparison, a binary high or a binary low is outputted as a reproduced bit signal. Meanwhile, if the detected reproducing signal signifies an error, a binary signal of a level opposite to a magnetization direction of its applied alternating magnetic field signal is outputted as the reproduced bit signal.

17 Claims, 8 Drawing Sheets

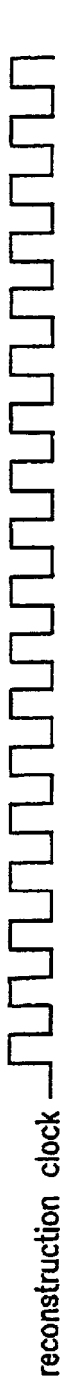
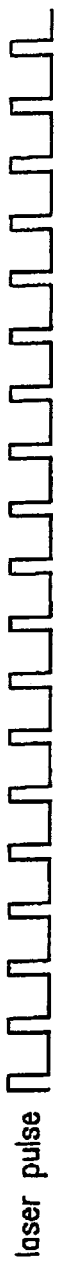
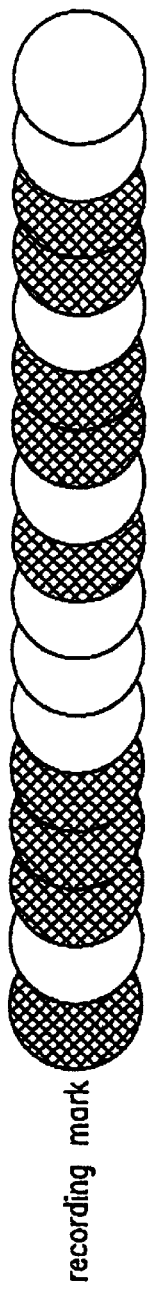
FIG.8A reconstruction clock
FIG.8B laser pulse
FIG.8C alternating magnetic field
FIG.8D recording mark
FIG.8E reconstruction signal
FIG.8F S/H# Verror Vref1 Vref2 Serror
FIG.8G reconstruction bit stream

DEVICE AND METHOD FOR REPRODUCING RECORD INFORMATION FROM MAGNETO-OPTICAL RECORDING MEDIUM

BACKGROUND OF THE INVENTION

1. Field of the Invention

The present invention relates to a device and method for reproducing recorded information from a magneto-optical recording medium.

2. Discussion of Related Art

A magneto-optical recording medium employed in recording information has been practically utilized in situations where high-density rewritable media has been desired. The magneto-optical recording medium using a recording layer made of an amorphous alloy of a rare-earth element and a transition metal has been especially useful.

A method for recording information is described as follows. A laser beam is collimated onto a face of an optical recording medium to increase temperature of a small spot of the recording layer to about 150–200C. When the temperature exceeds a curie temperature (Tc) a magnetization phenomenon on the spot of the optical recording medium disappears. Then a biasing magnetic field is applied to orient the magnetic field of the spot, and the spot is allowed to cool to indoor temperature. The magnetic field of the spots is observable as recording marks (or pits).

A process for recording the information on a magneto-optical recording medium will be hereinafter illustrated referring to FIGS. 1 and 2. FIG. 1 is a block diagram showing a general type of recording device and FIG. 2 represents timing diagrams of the operation of the general recording device shown in FIG. 1.

First, a channel clock generator 9 generates a channel clock signal 10 based on information pre-formatted on an optical disk. In response to the channel clock signal 10, a laser driver 11 controls pulse beam emissions of a laser diode 1. Such pulsed laser beam 2 is irradiated as an optics spot 4 onto an optical disk 8 through an object lens 3.

Meanwhile, a data signal generator 6 forms a modulated magnetic field 7 by using a magnetic head 5 adjacent to the optical disk 8.

As shown in FIGS. 2A to 2E, the optical spot 4 is pulsed onto a face of the optical disk 8 synchronous with the frequency of the channel clock signal 10. In such a process, the pulsing of laser beam 21, the modulating of magnetic field 7, and irradiating of the optic spot 4 occur synchronously to the channel clock signal 10 to record information onto the optical disk 8. Marks are piled up on the optical disk 8 and recorded by such irradiated optic spots 4. Magnetic pits having a shorter mark length than the optic spot 4 are recorded by such recording method, and such method is a well-known technique exhibited in Japanese Opening Patent No. Pyeong 1-292603.

In one method for reproducing the information written by the above recording method scheme on the optical disk, it is known in the art that the laser beam having a constant output is condensed and irradiated on the surface of the optical recording medium. The condensed optic spot is reflected on the surface of the magneto-optical recording medium, and a polarization state of the laser beam is changed by a Kerr effect. By detecting polarization state change of the reflected light, the information written on the disk can be read.

As shown in FIG. 3A, however, a problem occurs when density is increased. To increase density, the length of the magnetic mark becomes shorter. As a result, the optic spot becomes larger in relation to the length of the magnetic mark. Thus reproducing information becomes more error prone as the density increases.

A super resolution technique has been recently tried to overcome such shortcoming. A magnetically induced super resolution (MSR) using an exchange-combination force among multilayer films is provided as one settlement method out of the recent techniques.

One scheme for using an inner plane magnetization film in such MSR technique is offered in FIG. 4. In this scheme, the magneto-optical recording medium is made up of two layer films of an exchange-combination structure formed by a reproducing layer having comparatively a little coercive force and a recording layer having comparatively a strong coercive force.

The reproducing layer serves as the inner plane magnetization film at indoor temperature, meantime over a constant temperature, its magnetization direction is changed and the reproducing layer represents a perpendicular magnetization.

The recording layer is formed by the perpendicular magnetization film to keep the information. When the optical beam is irradiated onto the reproducing layer to read the information, the innerplane magnetization is changed to the perpendicular magnetization, on the reproducing layer, by a pole Kerr effect, at a high temperature region of the optical spot, namely at the central region where the temperature is over a threshold value as shown in FIG. 4. That is, the high temperature region of the reproducing layer is changed to the same direction as a magnetic field direction of the recording layer.

While, at low temperature regions peripheral to the high temperature region of the optical spot, the magnetization of the recording layer is masked since the pole Kerr phenomenon does not occur. Accordingly, a reproducing operation of the super resolution is available by properly selecting power of a reproducing laser beam, since recorded information is reproduced only at the high temperature region corresponding to the central portion of the optical spot.

One example of a device for reproducing the record information from the optical recording medium is shown in FIG. 5, and the timing diagrams are shown in FIGS. 6A–6E. This reproducing device employs a pulsed laser beam as the reproducing light. A reproducing clock generator 58 outputs a reproducing clock signal shown in FIG. 6A and a pulse generator 57 outputs a pulse type signal based on the reproducing clock signal. A laser driver 56 drives laser diode 55 in response to the pulsed signal. The pulsed laser beam emitted as shown in FIG. 6B from the laser diode 55 is condensed onto an optical recording medium 51 through a condenser 54 and an object lens 52. An optical spot condensed on the optical recording medium 51 is reflected and enters a first polarized beam splitter 53 through the object lens 52. The optical spot from the first polarized beam splitter 53 enters a second polarized beam splitter 59, and at this time, a P polarization element is let through and an S polarization element is reflected.

The P polarization element and the S polarization element are respectively condensed by a first photo detector 61 and a second photo detector 60, and converted into electrical signals. The converted signals are inputted to a differential amplifier 62 to be differentially amplified, and applied to a reproducing signal processor 63. The reproducing signal processor 63 processes the signal from the differential amplifier 62 and outputs a bit signal, namely a binary signal as detected information. FIG. 6D represents writing marks written on the optical recording medium 51 shown in FIG. 5. In FIG. 6D, hatched marks indicate a binary signal of a high level and white marks indicates a binary signal of a low level.

A magnetic amplifying magneto-optical system (MAMMOS) has been used as a technique to overcome problems related to high density writing as depicted in FIG. 3. Such technique realizes higher writing density by employing a magnetic film of two layers formed by a recording layer and an enlarged reproducing layer.

In this technique, an alternating reproducing magnetic field is applied onto the recording medium, to thereby enlarge a minute magnetic domain of a high density disk, copy the domain on the enlarged reproducing layer, and thus increase a detected reproducing signal. As shown in FIG. 6C, the alternating magnetic field is made up of a magnetic field signal of an up magnetization direction corresponding to a binary signal of a high level and a magnetic field signal of a down magnetization direction corresponding to a binary signal of a low level.

The alternating reproducing magnetic field is applied onto the recording medium regardless of the recording marks shown in FIG. 6D. That is, the magnetic field direction of the recording mark is not checked. Thus the field direction of the mark and the field direction of the alternating field may oppose each other. In such a situation, the reproduced signal may not be detected definitely if the magnetization direction of the applied alternating magnetic field signal is opposite to the signal of the recording mark.

Referring to FIGS. 6C to 6E, if the magnetization direction of the applied alternating magnetic field signal is the same as the signal of the recording mark, a level of the detected reproducing signal appears as L1 or L3. If they are not same as each other, the level of the reproducing signal shows as L2, as shown in FIG. 6E. The levels L1 and L3 are read as respective binary signals of a high level and a low level, but the level L2 can not be read as high or low. Reproducing signals of level L2 thus causes errors. For example, as shown in FIG. 6E, the detected level at positions $P_1$ and $P_2$ is $L_2$. However, the actual levels should be $L_1$ and $L_3$ for positions $P_1$ and $P_2$, respectively.

When using the MAMMOS technique, however, errors are unavoidable, since the alternating magnetic field is applied without regard to the magnetic field direction of the mark. Finally, even if a zero crossing or a level slicing is executed by the levels for detecting the high binary signal and the low binary signal, errors still may occur. The written binary information can not be read definitely in general in the method for level slicing the detected reproducing signal.

SUMMARY OF THE INVENTION

Accordingly, the present invention is directed to an information reproducing method and its device that substantially obviate one or more of the problems due to limitations and disadvantages of the related art.

An object of the present invention is to provide a method and device capable of reproducing record information more definitely, in reproducing the record information from a magneto-optical recording medium by using a reproducing magnetic field.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, reproducing light and a reproducing magnetic field signal are separately applied onto an optical recording medium in order to increase and detect record information; and, if a level of detected record information is not contained in any one out of binary signals of a high level and a low level, a binary signal of a level opposite to a magnetization direction of the applied reproducing magnetic field signal is outputted as the record information; such operational result in detecting the record information is based on the fact that the reproducing magnetic field signal of a magnetization direction opposite to a level of the binary signal corresponding to the record information is applied onto the magneto-optical recording medium.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

Figure 1:
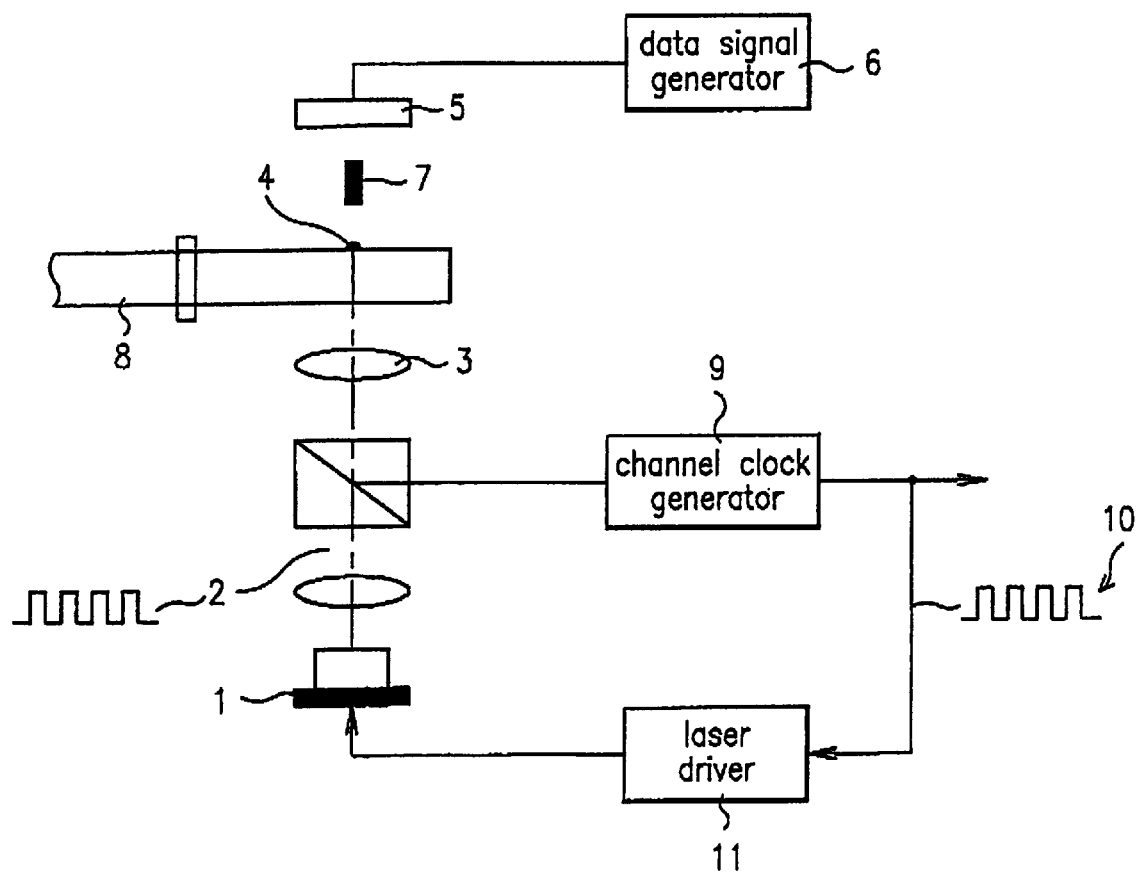
FIG. 1 shows a block diagram of a conventional device for record information on a magneto-optical recording medium.
Figure 2:
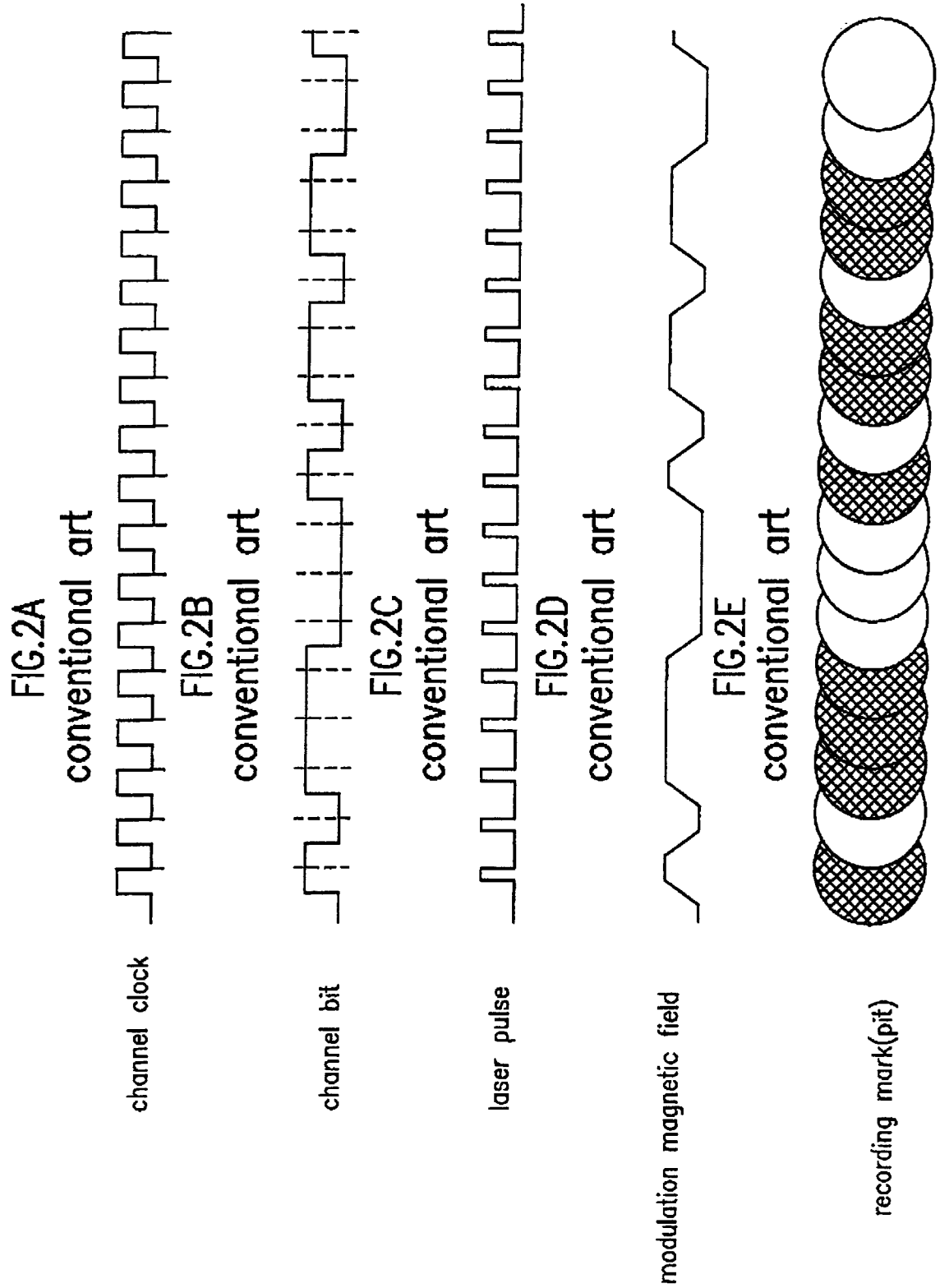
FIGS. 2A to 2E represent timing diagrams illustrating signals from respective parts of the conventional device in FIG. 1.
Figure 3:
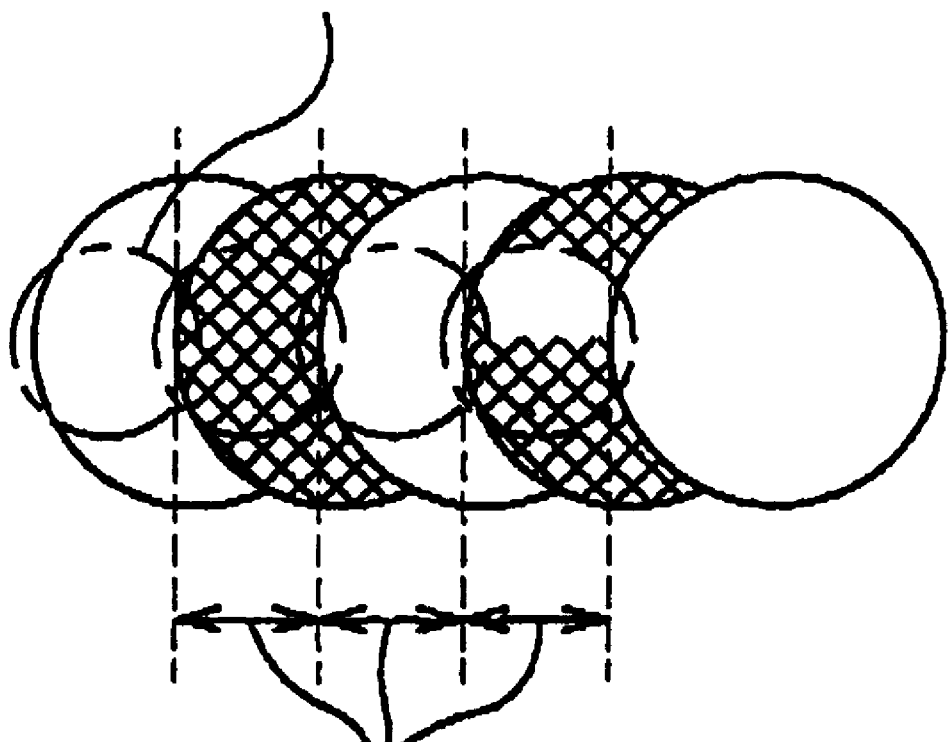
FIG. 3 illustrates a diagram presenting a shortcoming caused in reproducing information written in a high density on a magneto-optical recording medium.
Figure 4:
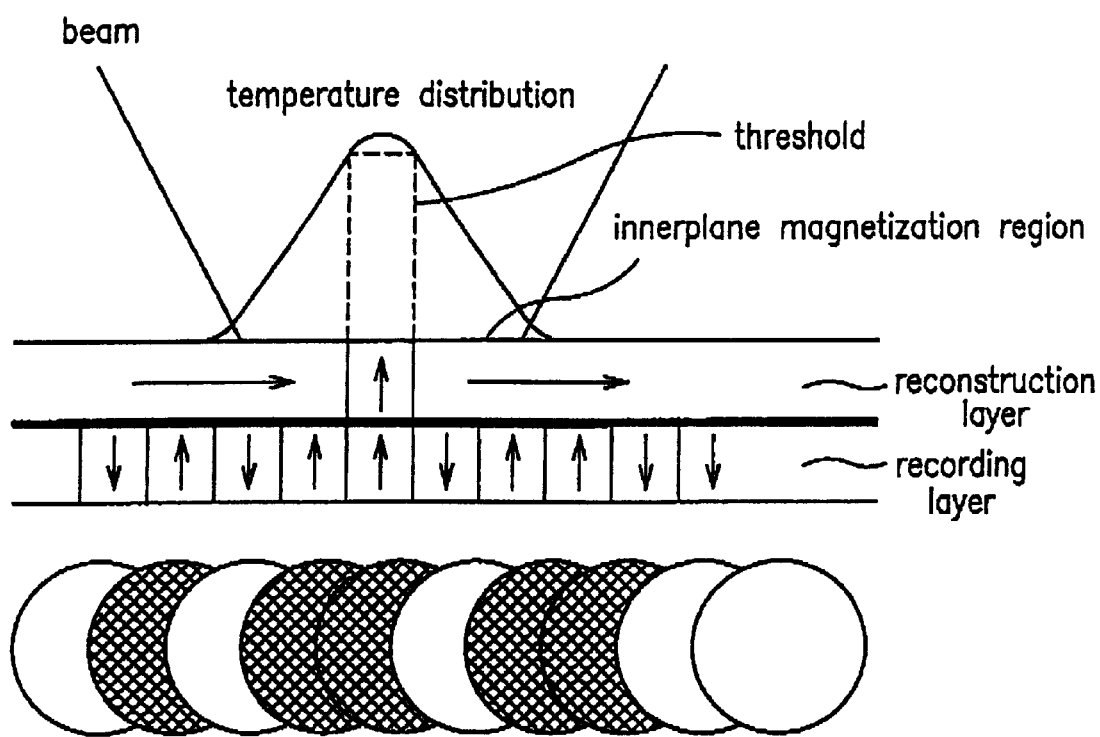

FIG. 4 sets forth a diagram explaining an MSR technique for reproducing record information through a use of an innerplane magnetization film.

Figure 5:
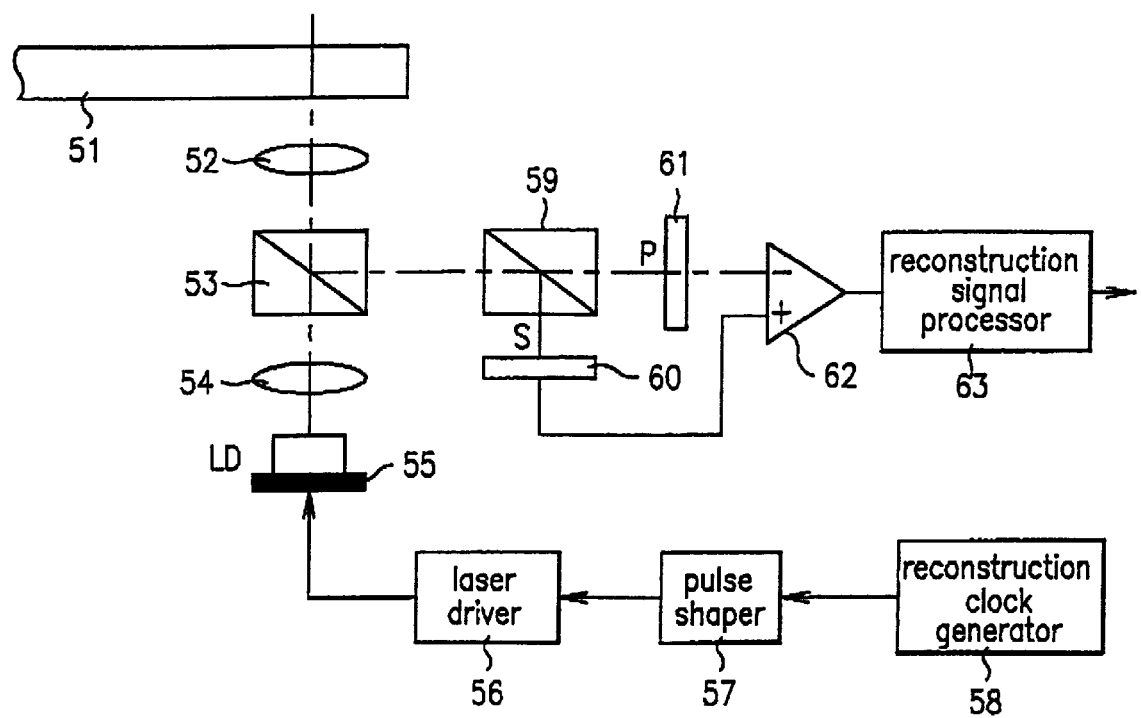
Figure 6:
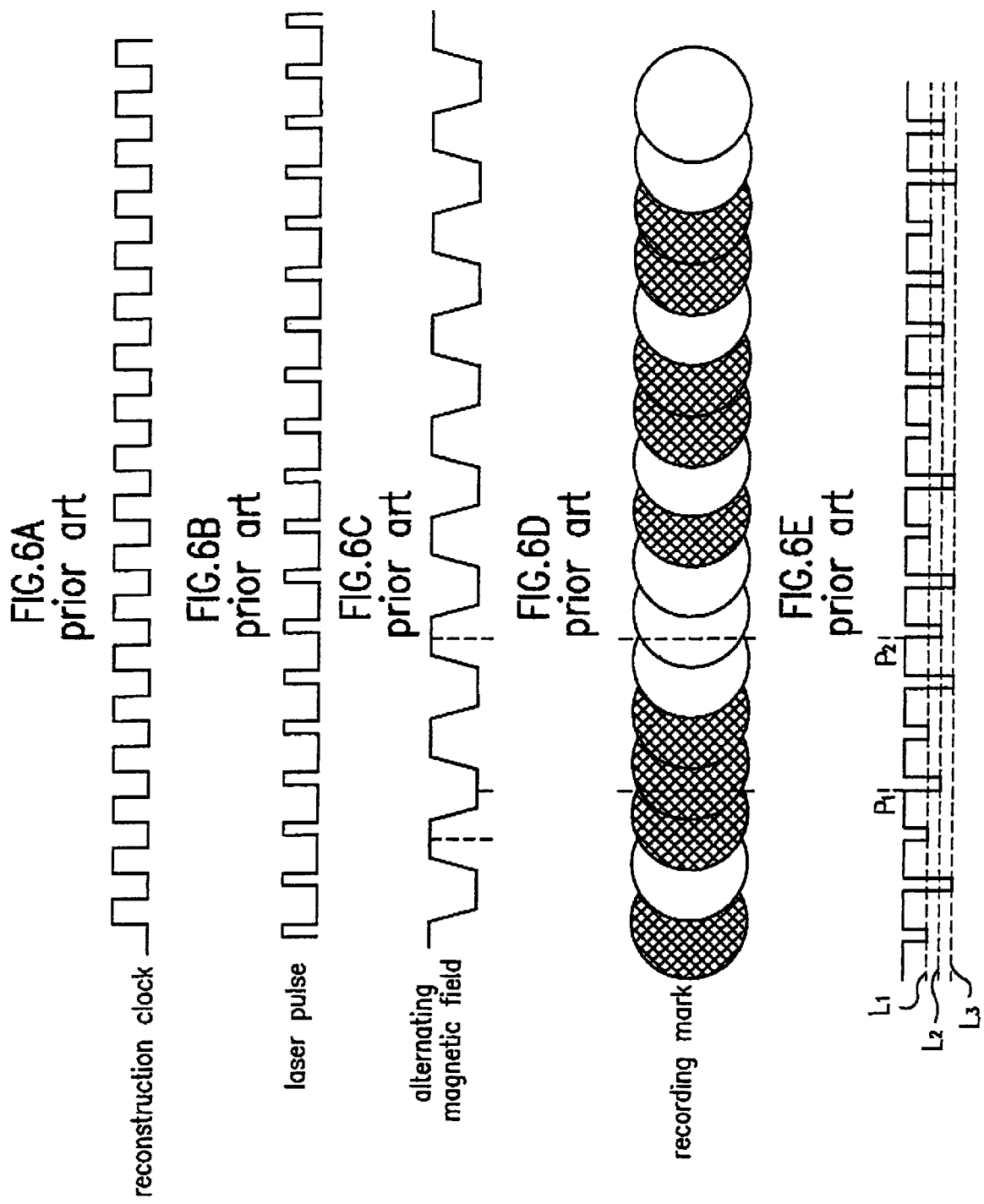

FIG. 5 provides a block diagram of the conventional device for reproducing record information from the magneto optical recording medium.

FIGS. 6A to 6E offer timing diagrams showing signals from respective parts of the conventional device in FIG. 5.

Figure 7:
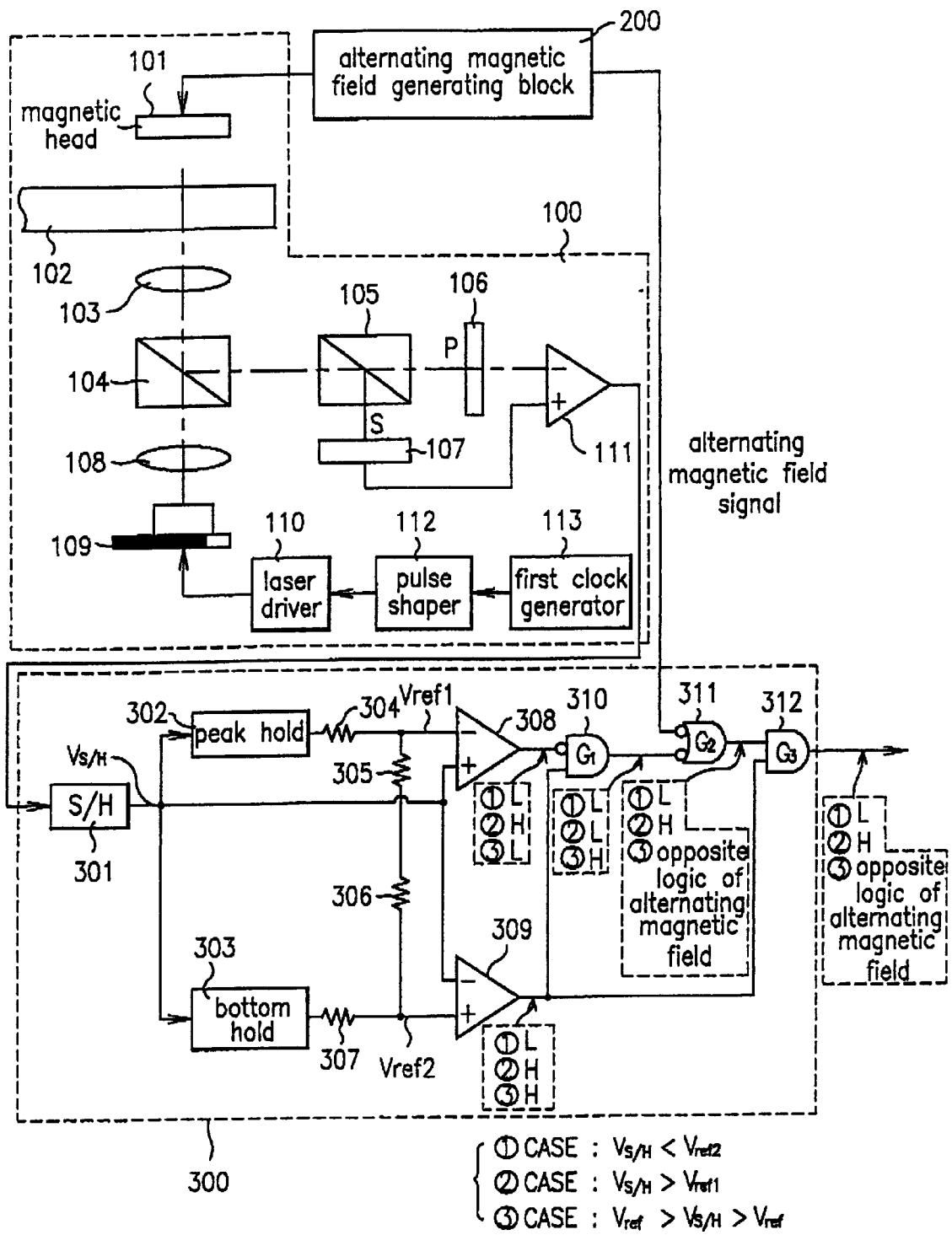

FIG. 7 furnishes a block diagram of a device for reproducing record information from a magneto-optical recording medium in accordance with the present invention.

FIGS. 8A to 8G are timing diagrams offering signals from several parts of the inventive device shown in FIG. 7.

DETAILED DESCRIPTION OF PREFERRED EMBODIMENT

Reference will now be made in detail to the preferred embodiments of the present invention, examples of which are illustrated in the accompanying drawings.

In FIGS. 7 and 8, the construction and operations of a signal reproducing block 100 shown in FIG. 7 are same as those in FIG. 5, thus their explanation is herein omitted.

Referring first to FIG. 7, a reproducing signal processing block 300 in an embodiment of the present invention outputs a binary signal of a high level or a low level correspondingly to a value of the detected signal from an optical recording medium 102. The reproducing signal processing block 300 also outputs the binary signal corresponding to the actual signal of the recording mark even though the reproducing signal appears in an error state.

A reproducing signal outputted and detected through a differential amplifier 111 of the signal reproducing block 100 in FIG. 7 is inputted to a sample and holder 301 of the reproducing signal processing block 300, as shown in FIG. 8E. The detected reproducing signal herewith should normally have a value as a binary signal "1" of high level or a binary signal "0" of low level. As shown in FIG. 8E, there exist however a signal having an intermediate value between the high and low levels. Such signals appear as error reproducing signals Serror as shown in FIG. 8F through the sample and holder 301.

In comparison with the error reproducing signals Serror of FIG. 8F and the recording marks of FIG. 8D, some among the reproducing signals detected through the alternating magnetic field of FIG. 8C appear as error signals of an intermediate level. Such error signals occur when the alternating magnetic field signal direction is opposite to the magnetization direction of the recording mark written on the magneto-optical recording medium 102. As mentioned above, signals Serror are generated since the alternating magnetic field is applied regardless of the field direction of the mark.

In accordance with the preferred embodiment of the present invention, to detect Serror signals, the reproducing signal processing block 300 includes specific comparators 308 and 309. Two reference values Vref1 and Vref2 are used in order for checking whether or not a signal reproduced from the magneto-optical recording medium 102 is the binary signal "1" of high level or the binary signal "0" of low level. Though two reference values are used, more than two reference values may be used to more exactly check the level of the error signals Serror.

The reproducing signal outputted from the sample and holder 301 of the reproducing signal processing block 300 has three levels, e.g., a peak level, a bottom level and an error level Verror, as shown in FIG. 8F. Then, a peak holder 302 and a bottom holder 303 respectively hold only a peak value and a bottom value of the detected reproducing signal from an output signal of the sample and holder 301.

The peak voltage is distributed by resistances 304 to 306, to thereby become a first reference value Vref1 for detecting a binary signal of high level. The bottom voltage is distributed by resistances 305 to 307, to thereby become a second reference value Vref2 for detecting a binary signal of low level. The relationship of the values may be described as Vref1>Vref2.

The first reference value Vref1 is inputted to an inverting input terminal (−) of EL first comparator 308, and the second reference value Vref2 is inputted to an inverting input terminal (−) of a second comparator 309. Also, the output signal from the sample and holder 301 is commonly inputted to non-inverting input terminals (+) of both first and second comparators 308 and 309. In such preferred embodiment thereof, though the reference values are inputted to the inverting input terminal (−) and the output signal from the sample and holder 301 to the non-inverting input terminal (+), in can be that the reference values are inputted to the non-inverting input terminal (+) and the output signal from the sample and holder 301 to the inverting input terminal (−).

Three cases occur in the preferred embodiment as the above. First, a value of the output signal Vsh from the sample and holder 301 is lower than the second reference value Vref2, namely Vsh<Vref2. Second, the value of the output signal Vsh from the sample and holder 301 is higher than the first reference value Vref1, namely Vsh>Vref1. Third, the value of the output signal Vsh from the sample and holder 301 exists between the first reference value Vref1 and the second reference value Vref2, namely Vref2<Vsh<Vref2.

In the first case, the first and second comparators 308 and 309 both output low signals, which are inputted to a first AND gate 310. Note that the inverted output signal of the first comparator 308 is inputted to the first AND gate 310. An output signal from the first AND gate 310 is inverted, then inputted to one input terminal of an OR gate 311. The other input terminal of the OR gate 311 receives an inverted alternating magnetic field signal from an alternating magnetic field generating block 200. The low signal outputted from the first AND gate 310 is inverted, then inputted to the OR gate 311 as a high signal, and the OR gate 311 outputs a high signal regardless of a magnetization direction of the reproducing magnetic field signal. A second AND gate 312 receives the high signal from the OR gate 311 and the low signal from the second comparator 309, thus outputs the low signal.

In the second case, when the output value Vsh from the sample and holder 301 is higher than the first reference value Vref1, the first and second comparators 308 and 309 both output high signals. However, the high signal outputted from the first comparator 308 is inverted into a low signal and inputted to the first AND gate 310. Thus, the first AND gate 310 receiving the output signals from the first and second comparators 308 and 309 outputs a low signal. Subsequently, the low signal from the first AND gate 310 is inverted into the high signal, and inputted to the OR gate 311. The OR gate 311 then outputs the high signal regardless of the inverted reproducing magnetic field signal as another input signal. The second AND gate 312 receiving the output signals from the OR gate 311 and the second comparator 309 outputs the high signal since the inputted signals are all the high signals.

In the third case, the value of the output signal Vsh from the sample and holder 301 is between the first reference value Vref1 and the second reference value Vref2. In such a case, a reproducing signal as an error state is outputted from the signal reproducing block 100.

At this time, the first comparator 308 outputs a low signal and the second comparator 309 outputs a high signal. Since two high signals are inputted to the first AND gate 310, the first AND gate 310 outputs the high signal. This high signal is inverted into a low signal, and inputted to one input terminal of the OR gate 311. The other input terminal of the OR gate 311 receives the inverted alternating magnetic field signal, thus the OR gate 311 outputs a level signal opposite to a magnetization direction of the alternating magnetic field signal.

That is, if the alternating magnetic field signal has an up magnetization direction, the OR gate 311 outputs a low signal; if the direction is downward, the OR gate 311 outputs a high signal. Since the second AND gate 312 receives the output signal from the OR gate 311 and the high signal from the second comparator 309, an output signal of the second AND gate 312 depends on the output signal of the OR gate 311.

The OR gate 311 outputs a binary signal of a level opposite to the magnetization direction of the alternating magnetic field signal. That is, as shown in FIG. 8C, if the alternating magnetic field signal direction is up corresponding to a binary high signal, the reproducing signal processing block 300 outputs a binary low as a reproducing bit signal. Or else, if the direction is down corresponding to a binary low signal, the reproducing signal processing block 300 outputs a binary high signal as a reproducing bit signal.

In accordance with the embodiment of the present invention, as mentioned above, error state occurs when the direction of the alternating magnetic field is opposite to the direction of the recording marks. Accordingly, a binary signal of a level opposite to a magnetization direction of such applied alternating magnetic field signal is outputted as the reproducing channel bit when error state occurs. Thus, correct information from the optical disk is detected even though the alternating magnetic field is applied regardless of the field direction of the mark.

It will be apparent to those skilled in the art that various modifications and variations can be made in the record information reproducing method and device of the present invention without departing from the spirit or scope of the invention. Thus, it is intended that the present invention covers the modifications and variations of this invention provided they come within the scope of the appended claims and their equivalents.

What is claimed is:

1. A method for reproducing record information from a magneto-optical recording medium, comprising:
    radiating a reproducing light onto the magneto-optical recording medium;
    applying an alternating magnetic field signal simultaneously with the step for radiating, the alternating magnetic field signal being either a binary high corresponding to an upward magnetization or a binary low corresponding to a downward magnetization;
    detecting a resultant signal from the magneto-optical recording medium in response to the steps for radiating and applying; and
    converting the detected resultant signal into a binary signal, wherein the binary signal corresponds to a binary value opposite to the binary value of the alternating magnetic field when the detected resultant signal corresponds to neither a binary high nor a binary low.

2. A method for reproducing record information from a magneto-optical recording medium, comprising:
    (a) detecting an electric signal from the magneto-optical recording medium by radiating a reproducing light onto the magneto-optical recording medium and simultaneously applying an alternating magnetic field made up of a signal of an upward magnetization direction corresponding to a high binary signal and a signal of a downward magnetization direction corresponding to a binary low;
    (b) converting detected electric signal into a binary signal by comparing the detected electric signal with two or more reference values for deciding the binary high and the binary low; and
    (c) converting said detected electric signal into the binary signal opposite to a magnetization direction of its applied alternating magnetic field signal, when said detected electric signal does not correspond to any one among a binary high and a binary low in said step (b).

3. The method of claim 2, further comprising:
    sampling and holding said electric signal in order for obtaining two or more reference values;
    detecting a peak value and a bottom value from sampled and held signal; and
    obtaining two or more reference values by distributing said peak value and said bottom value.

4. A method for reproducing record information from a magneto-optical recording medium, comprising:
    (a) detecting an electric signal from the magneto-optical recording medium by radiating reproducing light onto the magneto-optical recording medium and simultaneously applying an alternating magnetic field signal made up of a signal of an upward magnetization direction corresponding to a binary high and a signal of a downward magnetization direction corresponding to a binary low;
    (b) changing said electric signal to a binary high when detected electric signal is over a first reference value for deciding the binary high and a binary low when said detected electric signal is below a second reference value for deciding the binary low; and
    (c) converting said detected electric signal into a binary signal opposite to a magnetization direction of its applied alternating magnetic field signal, when said detected electric signal exists between the first reference value and the second reference value in said step (b).

5. The method of claim 4, further comprising:
    sampling and holding said detected electric signal in order for obtaining the first and second reference values;
    detecting a peak value and a bottom value from sampled and held signal; and
    obtaining the first reference value by distributing said peak value and the second reference value by distributing said bottom value.

6. A device for reproducing record information from a magneto-optical recording medium, comprising:
    an alternating magnetic field signal generating block for generating an alternating magnetic field signal made up of a signal of an upward magnetization direction corresponding to a binary high and a signal of a downward magnetization direction corresponding to a binary low;
    a reproducing light generating block for generating reproducing light;
    a reproducing block for detecting a reproducing signal from the magneto-optical recording medium by applying the reproducing light and the alternating magnetic field signal onto the magneto-optical recording medium; and
    a reproducing signal processing block for converting detected reproducing signal into any one signal out of the binary high and the binary low by comparing the detected reproducing signal with two or more reference values, and converting the detected reproducing signal into one binary signal opposite to a magnetization direction of applied alternating magnetic field signal when the reproducing signal is an error signal which is not contained into any one among the binary high and the binary low.

7. The device of claim 6, wherein said reproducing signal processing block comprises:
    a sample and holder for sampling and holding said detected reproducing signal;
    a reference value generator for generating a first reference value for deciding the binary high and a second reference value for deciding the binary low, by using an output signal from said sample and holder;
    a first comparator for receiving the first reference value through a first input terminal thereof and the output signal of the sample and holder via a second input terminal thereof;

a second comparator for receiving the second reference value through a first input terminal thereof and the output signal of the sample and holder via a second input terminal thereof; and a reproducing bit signal provider for outputting, as a reproducing bit signal, a binary signal corresponding to output signals when the output signals from the first and second comparators are the same, and outputting, as the reproducing bit signal, the binary signal opposite to the magnetization direction of said alternating magnetic field signal when said output signals are not the same.

8. The device of claim 6, wherein said reference value generator comprises:

a peak holder for holding a peak value of an output signal from said sample and holder;

a bottom holder for holding a bottom value of the output signal from said sample and holder; and a plurality of resistances for outputting the first reference value by distributing said peak value and the second reference value by distributing said bottom value.

9. The device of claim 6, wherein said first input terminal is any one out of an inverting input terminal and a non-inverting input terminal and said second input terminal is the other one therebetween.

10. The device of claim 6, wherein said reproducing bit signal provider comprises:

a first AND gate for receiving a signal that the output signal from the first comparator is inverted and the output signal of the second comparator;

an OR gate for receiving an inverted alternating magnetic field signal and an inverted output signal of said first AND gate; and a second AND gate for receiving an output signal of said OR gate and the output signal of the second comparator, and outputting the reproducing bit signal.

11. A method to read information from a magneto-optical medium, comprising:

(a) applying a reading laser beam to a mark on said magneto-optical medium;

(b) applying an alternating magnetic field to said mark, a direction of said alternating magnetic field alternating between states representing binary values one and zero;

(c) detecting a read signal from said mark in response to steps (a) and (b);

(d) outputting a corresponding binary value if said read signal detected in step (c) meets or exceeds threshold levels for one of binary one and binary zero, respectively; and (e) outputting a binary value opposite to said binary value of said alternating magnetic field if said read signal detected in step (c) does not meet or exceed said threshold levels.

12. The method of claim 11, wherein steps (a) and (b) are performed simultaneously and are synchronous with a channel clock.

13. The method of claim 11, wherein said reading laser beam is a pulsed laser beam.

14. The method of claim 11, wherein said binary one is outputted in step (d) when said read signal is at or above a first reference level said binary zero is outputted when said read signal is at or below a second reference level.

15. The method of claim 14, wherein an error signal is generated if said read signal is between said first and second reference levels.

16. A device to read information from a magneto-optical medium, comprising:

a reading laser beam generator applying a reading laser beam to a mark on said magneto-optical medium;

an alternating magnetic field generator applying an alternating magnetic field to said mark, a direction of said alternating magnetic field alternating between states representing binary values one and zero;

a read signal detector detecting a read signal from said mark in response to operations of said reading laser beam generator and said alternating magnetic field generator; and a signal reproducer outputting a corresponding binary value if said read signal detected by said read signal detector meets or exceeds threshold levels for one of binary one and binary zero, respectively, and outputting a binary value opposite to said binary value of said alternating magnetic field if said read signal does not meet or exceed said threshold levels.

17. A device of claim 16, wherein said signal reproducer comprises:

a sample and holder sampling and holding signal outputted from said read signal detector;

a peak holder to hold a peak signal level outputted from said sample and holder;

a bottom holder to hold a bottom signal level outputted from said sample and holder;

a first comparator comparing signal levels from said sample and holder and from said peak holder;

a second comparator comparing signal levels from said sample and holder and from said bottom holder;

a first AND gate receiving inverted output from said first comparator and non-inverted output from said second comparator;

an OR gate receiving inverted output from said first AND gate and inverted output from said alternating magnetic field generator; and a second AND gate receiving output from said OR gate and said second comparator.

* * * * *